United States Patent [19]

Mondshine

[11] Patent Number: 5,253,711
[45] Date of Patent: Oct. 19, 1993

[54] PROCESS FOR DECOMPOSING POLYSACCHARIDES IN ALKALINE AQUEOUS SYSTEMS

[75] Inventor: Thomas C. Mondshine, Houston, Tex.

[73] Assignee: Texas United Chemical Corp., Houston, Tex.

[21] Appl. No.: 844,167

[22] Filed: Mar. 2, 1992

[51] Int. Cl.$^5$ ............................................. E21B 43/26
[52] U.S. Cl. .................... 166/300; 166/308; 252/8.551; 252/326
[58] Field of Search ............... 166/300, 308; 252/8.551, 326, 358; 536/41, 80, 88

[56] References Cited

U.S. PATENT DOCUMENTS

| | | | |
|---|---|---|---|
| 1,953,398 | 4/1934 | Eskew | 536/41 |
| 2,268,215 | 12/1941 | Kerr | 127/33 |
| 3,167,510 | 1/1965 | Alter | 252/8.551 |
| 3,655,644 | 4/1972 | Durand | 106/211 X |
| 3,935,187 | 1/1976 | Speakman | 536/102 |
| 4,202,795 | 5/1980 | Burnham et al. | 166/308 X |
| 4,552,668 | 11/1985 | Brown et al. | 166/300 X |
| 4,787,959 | 11/1988 | Lachenal et al. | 162/25 |

Primary Examiner—George A. Suchfield
Attorney, Agent, or Firm—Roy F. House

[57] ABSTRACT

Alkaline earth metal or transition metal peroxides are used as a delayed breaker in alkaline aqueous fluids containing a water soluble hydrophilic polysaccharide polymer hydrated therein. The peroxide is activated by increasing the temperature of the fluid. The invention is particularly useful for the delayed break of hydraulic fracturing fluids containing hydroxypropyl guar polymer.

10 Claims, No Drawings

PROCESS FOR DECOMPOSING POLYSACCHARIDES IN ALKALINE AQUEOUS SYSTEMS

BACKGROUND OF THE INVENTION

The present invention relates to the decomposition of hydrophilic polysaccharide polymers in aqueous systems, and, more particularly, to a method of breaking down such polymers when they are present in the filter cake deposited from a well working fluid, and to a method of breaking a fracturing fluid containing such polymers.

PRIOR ART

Fluids of various types are used in well working operations. One major use of fluids is in earth formation fracturing. In fracturing the formation, a fluid is introduced into the well at a rate and pressure sufficient to produce one or more fractures in the formation and/or enlarge or extend existing fractures. The fluid normally contains a propping agent which is deposited in the fractures to keep the fractures from closing. In water base fluids, it is usually necessary to employ an additive which imparts sufficient viscosity to the fluid to maintain entrained solids in suspension. Representative additives include hydrophilic polysaccharide polymers such as guar gum, hydroxypropyl guar, carboxymethyl hydroxypropyl guar, hydroxyethyl cellulose, carboxymethyl hydroxethyl cellulose, and the like, all as is well known in the art. The hydrophilic polymer may be crosslinked as is also well known in the art. See for example Mondshine U.S. Pat. No. 4,619,776.

Once the formation is fractured and the proppant placed, it is desirable to reduce the viscosity of the fluid so that it may be easily removed from the formation. This is known as "breaking" the fluid. Conventionally, this breaking of the aqueous gel or fluid is carried out by adding a viscosity reducing agent, commonly called a "breaker," to the formation at the desired time. Unfortunately, the techniques and materials used often result in insufficient breaking (viscosity reduction) or premature, early breaking of the fluid. Premature breaking of the fluid causes a reduction in the viscosity of the fracturing fluid prior to the desired termination of the fracturing operation, thereby reducing the overall effectiveness of the operation. See for example Wyant et al. U.S. Pat. No. 3,163,219 and Nolte U.S. Pat. No. 4,506,734.

In recent years, it has been discovered that the permeability of proppant packs placed by the fracturing fluid may be significantly damaged by the gelling agents commonly used in hydraulic fracturing fluids. Studies have shown that the permeability is significantly impaired by the polymer residue even though sufficient breaker concentrations have been added to effectively reduce the fluid viscosity. See for example the following references, incorporated herein by reference: (1) SPE Technical Paper 20135, "Breaker Concentrations Required To Improve The Permeability Of Proppant Packs Damaged By Concentrated Linear And Borate-Crosslinked Fracturing Fluids," H. D. Brannon and R. J. Pulsinelli, Mar. 8-9, 1990; (2) SPE Technical Paper 19402, "Evaluation Of The Breaker Concentrations Required To Improve The Permeability Of Proppant Packs Damaged By Hydraulic Fracturing Fluids," H. D. Brannon and R. J. Pulsinelli, Feb. 22-23, 1990; (3) SPE Technical Paper 19433, "Encapsulated Breaker For Aqueous Polymeric Fluids," J. Gulbis, M. T. King, G. W. Hawkins, and H. D. Brannon, Feb. 22-23, 1990; (4) SPE Technical Paper 21716, "Increased Breaker Concentration In Fracturing Fluids Results In Improved Gas Well Performance," J. Elbel, J. Gulbis, M. T. King, and J. Maniere, Apr. 7-9, 1991.

The proppant pack permeability damage caused by the concentration of polymers in the pack has been observed to be significantly reduced only by the addition of elevated concentrations of the breaker. Unfortunately, the viscosity reduction of the fracturing fluid is accelerated by increasing breaker concentration and fluid temperature. Thus it has been proposed to control and/or delay the activity of the breaker by coating the breaker. See for example the following U.S. Pat. Nos., Burnham et al.-4,202,795; Nolte -4,506,734; Wales et al. -4,741,401.

Fluids containing hydrophilic polysaccharide polymers are also used in various other well working or drilling operations. See for example Mondshine U.S. Pat. Nos., 4,175,042; 4,186,803; 4,369,843; 4,620,596; 4,621,692; and Dobson, Jr. et al. U.S. Pat. No. 4,822,500. In such fluids typically a "filter cake" is deposited on the sides of the borehole or over packed perforation channels. This filter cake will contain the hydrophilic polymer. It is desirable to remove the filter cake before placing the well on production in order to allow the well fluids to flow unrestricted to the wellbore.

It is therefore highly desirable to decompose the hydrophilic polysaccharide polymer(s) present in hydraulic fracturing fluids or in the filter cake deposited within a well during various well working operations after such polymer(s) have accomplished their intended function.

Calcium peroxide is disclosed for use in bleaching compositions at a pH from 9.6 to 12.13 in Moyer U.S. Pat. No. 3,251,780, and at a pH from 3.0 to 9.5 in Moyer U.S. Pat. No. 3,259,584. Calcium peroxide particles coated with a coating agent containing a water-insoluble compound having a melting point of at least 50° C. are disclosed in Gago U.S. Pat. No. 4,293,426.

Alter U.S. Pat. No. 3,167,510 discloses a process of breaking well treating fluids containing guar gum using alkali metal persulfate oxidizers, and discloses at column 2, lines 56-62 and column 3, lines 1-5, that calcium peroxide, $CaO_2$, does not function as a breaker in his process.

SUMMARY OF THE INVENTION

In accordance with the present invention, processes are provided for: breaking fracturing fluids containing hydrophilic polysaccharide polymers; decomposing hydrophilic polysaccharide polymers contained within proppant-packs; and decomposing hydrophilic polysaccharide polymers contained within filter cakes present in a well.

These processes are accomplished by oxidizing the hydrophilic polysaccharide polymers with an alkaline earth or transition metal peroxide as disclosed hereinafter.

I have now found that alkaline earth-metal peroxides and zinc peroxide can be used to decompose water soluble hydrophilic polysaccharide polymers, hereinafter sometimes referred to as HPP, present in aqueous systems such as fracturing fluids, proppant-packs, and filter cakes in a well.

A high concentration of a peroxide selected from the group consisting of alkaline earth metal peroxides, zinc peroxide, and mixtures thereof, hereinafter sometimes referred to collectively as AEMP, can be added to fracturing fluids at ambient temperature without causing a significant viscosity decrease of the fluid until desired, i.e., until placement of the proppant in the fracturing fluid within the fractures created in the well by the fluid. The breakdown rate of the HPP will depend on the temperature of the fluid, the concentration of the AEMP, the particular AEMP present in the fluid, and the pH of the fluid. The fluid must have an alkaline pH otherwise the AEMP is solubilized at a rate which causes premature breaking of the fluid. Desirably the pH of the fluid is greater than about 7, preferably greater than about 9, and most preferably greater than about 10. The breakdown rate of the HPP increases as the temperature of the fluid increases. Thus for any given fluid temperature and pH, the breakdown rate of the HPP can be controlled by the proper selection of the AEMP and its concentration.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE INVENTION

I have found that AEMP in alkaline aqueous fluids containing HPP such as fracturing fluids will thermally decompose and release polymer breaking hydrogen peroxide. For any given fluid the rate and quantity of hydrogen peroxide released is controlled by the temperature of the fluid and the type and quantity of AEMP present in the fluid.

The AEMP are stable and only slightly soluble at ambient temperatures but thermally decompose and release hydrogen peroxide when subjected to heat. This enables the AEMP to provide a delayed breakdown of the fluid, i.e., sufficient AEMP can be incorporated into a fluid containing a HPP without excessive breakdown of the HPP until the fluid has accomplished its desired function.

Alkaline earth peroxides are known water insoluble compounds. See for example the following references, incorporated herein by reference: (a) "Peroxides, Superoxides, and Ozonides of Alkali and Alkaline Earth Metals," Il'ya Ivanovich Vol'nov (Translated by J. Woroncow, Edited by A. W. Petrocelli), Plerum Press, New York, 1966; (b) "Kirk-Othmer Encyclopedia of Chemical Technology," Third Edition, Vol. 17, John Wiley & Sons, 1982, pp. 1-26.

Inorganic peroxide compounds are commonly described as compounds whose structures include the peroxo-group, —o—o—. Simple peroxide compounds include peroxides in which the peroxo-group is bonded to a metallic atom via ionic bonding, and includes hydroperoxides characterized by the presence of the hydroperoxyl ion $(HO_2)^-$. Complex peroxide compounds include peroxides in which the peroxo-group as such, or in the form of $H_2O_2$, is bonded to the metallic atom by a covalent bond. Complex peroxide compounds also include the addition compounds formed with crystallized hydrogen peroxide.

The characteristic properties of peroxide compounds both simple and complex, are: the formation of hydrogen peroxide upon reaction with dilute acid solution, the liberation of oxygen as a result of thermal decomposition, and the liberation of oxygen upon reaction with water and other chemical agents. Further characterization is possible by dividing the simple inorganic peroxide compounds into four groups: (1) hydroperoxide, characterized by the $(HO_2)^-$ ion; (2) peroxides, characterized by the $(O_2)^{2-}$ ion; (3) superoxides characterized by the $(O_2)^-$ ion; and (4) ozonides, characterized by the $(O_3)^-$ ion.

The hydrolysis of peroxides and hydroperoxides proceeds as follows:

$$M\ O_2 + 2H_2O \rightarrow M(OH)_2 + H_2O_2$$

and $$MOOH + H_2O \rightarrow MOH + H_2O_2$$

where M=metal. For this reason, peroxides and hydroperoxides are considered as being derived from hydrogen peroxide by replacement of one or both the hydrogen atoms by metal atoms.

Complex peroxide compounds include peroxyhydrates, for example, $CaO_2 \cdot 2H_2O_2$, and peroxyhydrate hydrates, for example, $BaO_2 \cdot H_2O_2 \cdot 2H_2O$.

Peroxides of calcium, strontium and barium belong to the $M^{2+}O_2^{2-}$ type of peroxide compounds, while peroxides of magnesium and zinc, of general formula $MO_2 \cdot xH_2O$, probably belong to the HO—M—OOH type where the covalent bond between the hydroperoxyl group and the metal atom is the same as that in hydrogen peroxide.

Calcium peroxide is generally prepared by industrial processes which provide a product containing 60-75 wt. % $CaO_2$. Reaction of $CaO_2 \cdot 8H_2O$ with solutions containing greater than 20 wt. % of hydrogen peroxide results in the formation of calcium peroxyhydrate, $CaO_2 \cdot 2H_2O_2$. Strontium peroxide, industrial grade, generally contains 80-95% $SrO_2$. Industrial grade barium peroxide generally contains up to about 90% $BaO_2$. Depending on its method of production, industrial grade magnesium peroxide contains from about 25% $MgO_2$ to about 50% $MgO_2$ and generally is a mixture of peroxide, oxide, and magnesium oxide hydrate. Industrial grade zinc peroxide contains about 55% $ZnO_2$.

The water soluble hydrophilic polysaccharide polymers useful in this invention may be any of such polymers well known in the art. See for example the book "Handbook of Water-Soluble Gums and Resins," Robert L. Davidson, Editor, McGraw-Hill Book Co., 1980, incorporated herein by reference. Representative polymers include water soluble salts of alginic acid, carrageenan, gum agar, gum arabic, gum ghatti, gum karaya, gum tragacanth, locust bean gum, tamarind gum, cellulose derivatives such as hydroxyethyl cellulose, hydroxypropyl cellulose, carboxymethyl cellulose, hydroxyethyl carboxymethyl cellulose, and the alkyl cellulose ethers, starch derivative such as carboxymethyl starch, hydroxyethyl starch, hydroxypropyl starch, and crosslinked starch ethers, guar gum and its derivatives, such as hydroxypropyl guar, hydroxyethyl guar and carboxymethyl guar, and biopolymers such as xanthan gum, gellan gum, welan gum, and the like.

The polymers useful in fracturing fluids are glycans containing monosaccharide units having adjacent cis-hydroxyl groups attached to the sugar ring structure, or derivatives thereof. Such groups, unlike hydroxyl groups adjacent to one another in the trans position, are highly susceptible to oxidation and undergo extensive complex forming and cross-linking reactions with a variety of polyvalent cation and boron-containing cross-linking agents. These reactions permit the ready formation of polysaccharide gels of the type utilized in accordance with the invention. Monosaccharide units having adjacent cis-hydroxyl groups include D-mannose, D-mannuronic acid and D-mannopyranose. Glycans containing such units may be homoglycans or heteroglycans. Typical homoglycans include $1,4'$-D-mannose linear polysaccharides such as ivory nut mannan, wood mannan and salep mannan; $1,4'$-D-mannuronic acid linear polysaccharides such as alginic acid; $1,2',1,3'$- and $1,6'$-D-mannose branched chain polysaccharides such as yeast mannan; $1,4'$-D-mannose branched chain polysaccharides such as the mannan of *Porphyra umbilicis*; and other D-mannose polysaccharides such as mannocarolose. Heteroglycans containing adjacent cis-hydroxyl groups include $1,4'$- and $1,6'$-D-galactose and D-mannose polysaccharides such as guaran and locust bean gum; glucomannans such as those obtained from Amorphophallus and *Aloe vera*; galactomannans such as those obtained from the endosperms of the honey locust, flame tree, Kentucky coffee bean, paloverde, tarn, lucerne, huizache and *Sophora japonica*; D-arabinose and D-mannose polysaccharides; D-glucose, D-mannose and D-galactose polysaccharides; and D-galactose, D-mannose and N-acetyl-D-glucosamine polysaccharides. It will be understood that all of the above named materials are not equally effective for purposes as viscosifiers for fracturing fluids and that certain materials will be preferred over others.

Preferred polysaccharides for use in fracturing fluids include the galactomannans derived from vegetable sources. Upon hydrolysis those materials yield the two simple sugars, mannose and galactose. Analyses have indicated them to be long chain polymers of D-mannopyranose units linked at the $\beta$-1,4-positions and having D-galactopyranose units located as chains on the molecule. The D-galactopyranose units are connected to the $C_6$ atoms of the D-mannose units which make up the main structural framework. The ratio of D-galactose to D-mannose in the galactomannans varies from about 1:1.2 to about 1:2, depending upon the particular vegetable source from which it is obtained. In all cases, however, the mannose residues have cis hydroxyl groups at the $C_6$ and $C_3$ positions, accounting for the gelling properties of the galactommans and making them useful for purposes of the present invention.

Galactomannans are major constituents of the seeds of a variety of plants. Plants from which they be extracted include tara, *Caesalpinia spinosa*; huizache, *Caesalpinla cacalaco*; locust bean, *Ceratonia seliqua*; paloverde, *Cercidium torreyanam*; the flame tree, *Delonix regia*; guar, *Cyanopsis tetriagonolobus*; the honey locust, *Gleditsia triacanthos*; the Kentucky coffee bean, *Gymnocladus dioica*; the prairie mimosa, *Desmanthus illnoensis*; senna, *Cassia leptocarpa*; rattlebox, *Crotalaria intermedia*; clover, *Trijolium pratense*; and soy bean hulls, *Glycine soja*. In recent years guar seeds cultivated in the southwestern section of the United States have provided much of the galactomannan marketed commercially. Because the guar seed product is available from a number of commercial sources at relatively low cost, galactomannan derived from this source is particularly preferred for purposes of the invention.

The hydroxypropyl ether derivative of guar gum is the preferred polymer used in the fracturing fluid industry at the present time.

The preferred polymers useful in well workover and completion fluids are derivatives of cellulose, derivatives of starch, and various biopolymers. Representative cellulose derivatives include hydroxyethyl cellulose, carboxymethyl cellulose, hydroxyethyl carboxymethyl cellulose, hydroxypropyl cellulose, and the like. Representative starch derivatives are hydroxyethyl starch, hydroxypropyl starch, carboxymethyl starch, and such starch derivatives further crosslinked with a difunctional molecule, such as epichlorohydrin or phosphorous oxychloride. The preferred starch derivative is epichlorohydrin crosslinked hydroxypropyl starch as disclosed in Dobson, Jr. et al. U.S. Pat. No. 4,822,500, incorporated herein by reference. Representative biopolymers are xanthomonous (xanthan) gum, gellan gum (see Baird et al. U.S. Pat. No. 4,503,084), and welan gum (see Kang et al. U.S. Pat. No. 4,342,866).

The concentration of the AEMP must be sufficient to provide the desired degree of breakdown of the polymer in the treated fluid at the temperature to which the fluid is heated and aged. Generally a concentration in the range from about 0.01 kg/m$^3$ to about 1.8 kg/m$^3$ will be incorporated into the fracturing fluid or other aqueous fluid containing the HPP. Preferably the concentration of calcium peroxide is in the range from about 0.01 kg/m$^3$ to about 1.0 kg/m$^3$ and the concentration of magnesium peroxide is in the range from about 0.18 kg/m$^3$ to about 1.8 kg/m$^3$.

The process of the invention is accomplished by adding the AEMP to an alkaline aqueous fluid having a HPP hydrated therein, and increasing the temperature of the fluid to activate the peroxide and decompose or breakdown the HPP. The fluid should be aged at the desired temperature for a period of time sufficient to effect the desired degree of breakdown of the polymer, which as discussed hereinbefore, is dependent upon the particular AEMP added and its concentration. In the case of a fracturing fluid, the temperature is increased by leaving the fluid within a subterranean formation after creating fractures therein.

As is well known in the art, certain HPP may be crosslinked. Crosslinking increases the effective molecular weight of the polymer creating an enhanced viscosity increase and even gelation of the aqueous fluid containing the hydrated HPP. See for example Mondshine U.S. Pat. No. 4,619,776, incorporated herein by reference. The AEMP is effective as a delayed breaker for decomposing the HPP in both its crosslinked and non-crosslinked forms, provided that the hydrated HPP is present in an aqueous fluid at an alkaline pH, most preferably at a pH of at least about 10.

It is speculated that some breakdown of the HPP takes place as soon as the AEMP is added to the fluid containing the HPP. However, with the proper selection of the particular AEMP and its concentration, based on the temperature to which the fluid will be heated as discussed herein, the breakdown rate of the HPP will be insufficient to prevent the fluid from accomplishing its intended purpose. Yet, once the fluid has accomplished its intended purpose, the HPP will breakdown. In the case of a fracturing fluid, the fluid can then be flowed back out of the fractures leaving behind the proppant packed within the fractures.

The AEMP is an essentially insoluble particulate material at ambient temperature. As long as it remains insoluble, it will be concentrated in leak off derived filter cakes at the formation-fracture interface. Upon aging at the temperature of the formation, the AEMP will become activated and, hence, react with and decompose the HPP. This will increase the conductivity of the proppant-pack within the fractures.

The solubility rate and hence the reactivity rate of the AEMP can be decreased if necessary by coating the AEMP. The coating material may be a water-insoluble, oil-soluble material, or a water-soluble material that is only slowly soluble in the aqueous fluid containing the hydrated HPP. See for example Wyant U.S. Pat. No. 3,163,219, incorporated herein by reference. Alternatively, the AEMP can be incorporated into an enclosure member as disclosed in Walles et al. U.S. Pat. No. 4,741,401, incorporated herein by reference, or in hollow or porous, crushable beads, as disclosed by Nolte U.S. Pat. No. 4,506,734, incorporated herein by reference.

Where desired, the reactivity of the AEMP can be enhanced by the addition of a catalyst to the fluid containing the HPP before or after the addition of the AEMP to the fluid. Suitable catalysts include the transition metal cations, such as copper, nickel, cobalt, iron, manganese, and the like which have been complexed to insure their stability in alkaline solutions. Known complexing agents include such chelating agents as ethylenediamine-tetraacetic acid, nitrilotri (methylenephosphonic acid), and the like. The catalyst may be coated to delay its reaction with the AEMP until after the fluid containing the HPP has performed its intended function.

Where desirable, the AEMP can be used in conjunction with known breakers for aqueous fluids containing HPP. Such commonly used breakers include oxidizing agents and enzymes. Specific examples of breakers include sodium persulfate, ammonium persulfate, potassium persulfate, alpha and beta amylases, amyloglucosidase, aligoglucosidase, invertase, maltase, cellulase, hemicellulase, and the like. These breakers may also be coated or otherwise treated as disclosed herein to delay their effect on the HPP.

The following examples describe the manner and process of making and using the invention and set forth the best mode contemplated by the inventor for carrying out the invention, but are not to be construed as limiting the invention.

The fracturing fluid used to evaluate the AEMP breakers of this invention was prepared as follows: hydroxypropyl guar was dispersed and hydrated in tap water at a concentration of 4.8 kg/m$^3$; 0.3% by volume of a 35% by weight potassium carbonate solution was added while mixing at a speed sufficient to create a vortex in the fluid; the desired concentration of AEMP was then added and dispersed in the fluid; 0.25% by volume of FRACSAL WW crosslinking agent was then added and mixed until the crosslinking caused the fluid vortex to completely close and the top of the fluid to become static.

EXAMPLE I

Various concentrations of magnesium peroxide were evaluated as breakers for the fracturing fluid at various temperatures as indicated in Table I. Commercial magnesium peroxide comprising 25% MgO$_2$ in a mixture with MgO and Mg(OH)$_2$ was used as the source of magnesium peroxide.

The viscosity of the fracturing fluid was measured after various elapsed times at the indicated temperature, and the relative % polysaccharide breakdown was calculated using the formula:

$$\% \text{ Polysaccharide Breakdown} = \frac{(\text{Initial Viscosity} - \text{Measured Viscosity})}{\text{Initial Viscosity}} \times 100$$

The data obtained are given Table I.

TABLE I

| MgO$_2$[1] Concentration kg/m$^3$ | Temp. °F. | % Polysaccharide Breakdown After The Indicated Elapsed Time, Minutes | | | | | | | | |
|---|---|---|---|---|---|---|---|---|---|---|
| | | 0 | 30 | 60 | 90 | 120 | 150 | 180 | 240 | 300 |
| 1.2 | 175 | 0 | 0 | 0 | 0 | | — | 15 | 95 | 100 |
| 1.2 | 200 | 0 | 0 | 10 | 20 | 60 | 90 | 100 | — | — |
| 0.3 | 250 | 0 | 0 | 0 | 20 | 100 | — | — | — | — |
| 1.2 | 250 | 0 | 25 | 50 | 75 | 100 | — | — | — | — |

[1]100% active basis

EXAMPLE II

Various concentrations of calcium peroxide were evaluated as breakers for the fracturing fluid at various temperatures as indicated in Table II. Commercial calcium peroxide comprising 75% CaO$_2$ and 25% of a mixture of calcium hydroxide and calcium carbonate was used as the source of calcium peroxide. The viscosity of the treated fracturing fluid was measured after various elapsed times at the indicated temperature. The viscosity, in centipoise, was measured at 100 rpm with a Modified Fann rheometer of the type set forth in the American Petroleum Institute Standard API RP 13B. The data obtained are given in Table II.

Comparison of the data in Tables I and II indicate that calcium peroxide is more effective than magnesium peroxide in breaking down the polymer at lower temperatures. Magnesium peroxide can be added to a fluid containing a polysaccharide polymer to produce a delayed break at relatively high temperatures, whereas calcium peroxide can be added to produce a delayed break at relatively low temperatures.

TABLE II

| CaO$_2$[1] Concentration kg/m$^3$ | Temp. °F. | Viscosity After The Indicated Elapsed Time, Minutes | | | | | | | | |
| --- | --- | --- | --- | --- | --- | --- | --- | --- | --- | --- |
|  |  | 30 | 60 | 90 | 120 | 150 | 180 | 210 | 240 | 1200 |
| 0.43 | 100 | (2) | (2) | (2) | (2) | (2) | (2) | 87 | — | 6 |
| 0.43 | 120 | 162 | 19.5 | 9 | 6 | 6 | — | — | — | 4.5 |
| 0.07 | 150 | (2) | 352 | 216 | 174 | 219 | 165 | — | — | — |
| 0.07 | 175 | (2) | (2) | 198 | 201 | — | 10 | — | 7.5 | — |
| 0.07 | 200 | 265 | 7.5 | 6 | 4.5 | 4.5 | — | — | — | — |

[1] 100% active base
[2] Too viscous to measure

What is claimed is:

1. The method for the delayed breaking of an alkaline fracturing fluid having a hydrophilic polysaccharide polymer hydrated therein which comprises adding to the fluid a peroxide selected from the group consisting of alkaline earth metal peroxides, zinc peroxide, and mixtures thereof and raising the temperature of the fluid after the fluid has been used to fracture a subterranean formation by allowing the fluid to remain in the fractured formation for a period of time sufficient to effect breakdown of the polymer.

2. The method of claim 1 wherein the concentration of the peroxide is from about 0.01 kg/m$^3$ to about 1.8 kg/m$^3$.

3. The method of claim 1 wherein the peroxide is selected from the group consisting of calcium peroxide, magnesium peroxide, and mixtures thereof.

4. The method of claim 3 wherein the concentration of the calcium peroxide when present is within the range from about 0.01 kg/m$^3$ to about 1.0 kg/m$^3$, and wherein the concentration of the magnesium peroxide when present is within the range from about 0.18 kg/m$^3$ to about 1.8 kg/m$^3$.

5. The method of claim 1, 2, 3, or 4 wherein the polymer is hydroxypropyl guar.

6. The method of breaking an alkaline fracturing fluid having a hydrophilic polysaccharide polymer hydrated therein which comprises adding to the fluid a peroxide selected from the group consisting of alkaline earth metal peroxides, zinc peroxide, and mixtures thereof, the concentration of the peroxide being sufficient to break the fracturing fluid at the desired temperature and pH of the fracturing fluid.

7. The method of claim 6 wherein the concentration of the peroxide is from about 0.01 kg/m$^3$ to about 1.8 kg/m$^3$.

8. The method of claim 6 wherein the peroxide is selected from the group consisting of calcium peroxide, magnesium peroxide, and mixtures thereof.

9. The method of claim 8 wherein the concentration of the calcium peroxide when present is within the range from about 0.01 kg/m$^3$ to about 1.0 kg/m$^3$, and wherein the concentration of the magnesium peroxide when present is within the range from about 0.18 kg/m$^3$ to about 1.8 kg/m$^3$.

10. The method of claim 6, 7, 8, or 9 wherein the polymer is hydroxypropyl guar.

* * * * *